United States Patent [19]

Asami

[11] 3,793,030
[45] Feb. 19, 1974

[54] PROCESS FOR PRODUCING DIAZOTYPE LIGHT-SENSITIVE MATERIAL

[75] Inventor: Tomiaki Asami, Yokohama, Japan

[73] Assignee: Kabushiki Kaisha Ricoh, Tokyo, Japan

[22] Filed: Sept. 2, 1971

[21] Appl. No.: 177,423

Related U.S. Application Data

[63] Continuation-in-part of Ser. No. 777,496, Nov. 20, 1968, abandoned.

[52] U.S. Cl. .................................... 96/91 R, 117/34
[51] Int. Cl. ............................................. G03c 1/74
[58] Field of Search ........... 96/49, 75, 91 R; 117/34

[56] References Cited
UNITED STATES PATENTS

| | | | |
|---|---|---|---|
| 3,301,679 | 1/1967 | Halperin et al. | 96/75 |
| 3,420,666 | 1/1969 | Welch et al. | 96/91 |
| 3,416,924 | 12/1968 | Tummers | 96/75 |
| 2,780,547 | 2/1957 | Ferzola et al. | 96/75 |
| 3,298,834 | 1/1967 | Eldred et al. | 96/91 |
| 3,331,689 | 7/1967 | Sosnousky et al. | 96/49 |
| 2,774,669 | 12/1956 | Marron et al. | 96/49 |

FOREIGN PATENTS OR APPLICATIONS

| | | | |
|---|---|---|---|
| 702,294 | 1/1954 | Great Britain | 96/91 |
| 752,002 | 7/1956 | Great Britain | 96/91 |

Primary Examiner—William D. Martin
Assistant Examiner—Harry J. Gwinnell

[57] ABSTRACT

A diazotype light-sensitive material is produced by coating a light-sensitive composition on a supporting sheet, said light-sensitive composition being prepared by dissolving a water soluble synthetic resin or a denatured starch in water and then dissolving in the resulting solution an azo coupling component and then adding thereto a light sensitive diazonium compound, which order of addition prevents the formation of a tar-like material or a water-insoluble precipitate by interaction of the azo coupling component and the diazonium compound.

5 Claims, No Drawings

PROCESS FOR PRODUCING DIAZOTYPE LIGHT-SENSITIVE MATERIAL

The present application is a continuation in part of co-pending application Ser. No. 777,496 filed Nov. 20, 1968, now abandoned.

BACKGROUND OF THE INVENTION

A two-component diazotype light-sensitive material commonly comprises a supporting sheet having, on the surface layer thereof, as principal ingredients, an azo coupling component and a diazonium compound which couple to form an azo dyestuff. Such a two-component diazotype light-sensitive material may be produced by coating a light-sensitive composition on a supporting sheet, said light-sensitive composition generally being prepared by dissolving an azo coupling component and a diazonium compound in water, together with other ingredients such as an acid stabilizer, an antioxidant, a wetting agent and an intensifier. However, certain azo coupling components react with diazonium compounds to form a tar-like material or a water-insoluble precipitate in an aqueous solution. Therefore, a light-sensitive composition containing such azo coupling components together with diazonium compounds cannot be prepared. These azo coupling components include, for example, polyhydroxybenzoic acids, their derivatives and salts thereof such as sodium-, potassium-, calcium- and ammonium salts.

When one of the aforesaid compounds is used as the azo coupling component, it is required to coat the azo coupling component and the diazonium compound on a supporting sheet in two successive processes or steps. The use of such two processes or steps is expensive and therefore is not commercially practical.

However, even when using the two processes, certain coupling components such as polyhydroxybenzoic acids or their derivatives, when coated, react with the diazonium compound to produce a tar-like material on the surface of the supporting sheet.

It is, therefore, an object of the present invention to provide a process for producing a diazotype light-sensitive material by coating a light-sensitive composition on a supporting sheet, in which an azo coupling component and a diazonium compound are both present.

SUMMARY OF THE INVENTION

The present invention relates to a process for producing a diazotype light-sensitive material by coating a light-sensitive composition on a supporting sheet, said light-sensitive composition having been prepared by dissolving an azo coupling component, a diazonium compound and other conventional additives in an aqueous solution containing a protective colloid.

Some azo coupling components cannot be dissolved together with diazonium compounds in an aqueous solution because of the formation of a tar-like material or a water-insoluble precipitate, by interaction of said azo coupling components and diazonium compounds.

We have found that the formation of a tar-like material or a water-insoluble precipitate may be prevented by employing a protective colloid. The present invention is based on this discovery.

According to the present invention, a diazotype light-sensitive composition is prepared by the following steps:

dissolving a water-soluble synthetic resin or a denatured starch in water to provide a protective colloid, and then dissolving in the resulting solution, one or more azo coupling components, one or more diazonium compounds and other conventional additives such as an acid stabilizer, an antioxidant, a wetting agent and an intensifier in the order set out above.

The light-sensitive composition thus prepared may be coated on a supporting sheet such as paper to provide a two-component diazotype light-sensitive material.

The water-soluble synthetic resin is preferably polyvinyl alcohol and the denatured starch is preferably an starch or an etherified starch. The ethylated starch is obtained by ethylation of a starch such as corn starch or rice starch with diethyl sulfate and the etherified starch is obtained by denaturation of a starch with methyl ether or ethyl ether.

Compounds used as the above-mentioned azo coupling component a polyhydroxybenzoic acid such as 2,6-dihydroxybenzoic acid and 2,4,6-trihydroxybenzoic acid, derivatives thereof such as 2,6-dihydroxy-3,5-dichlorobenzoic acid, 2,6-dihydroxy-4-methoxybenzoic acid, 2,6-dihydroxy-3-ethyl-5-chlorobenzoic acid and 2,4,6-trihydroxy-3-benzoylbenzoic acid, the sodium-, potassium-, calcium- or ammonium salts of said polyhydroxy-benzoic acid and derivatives thereof. Said sodium-, potassium-, calcium- and ammonium salts can be used as an azo coupling component in the same manner.

The above-mentioned diazonium compounds are 4-(N,N-diethylamino)benzene diazonium, 4-(N,N-dimethylamino)benzene diazonium, 2,3-diethoxy-4-(N-benzylamino)benzene diazonium, 4-(N-ethyl-N-benzylamino)benzene diazonium and 4-(N-cyanoethyl-N-cyclohexylamino)benzene diazonium. These diazonium compounds are used in the form of their stable diazonium sulfate, or borofluoride, or in the form of the double salts of the diazonium chloride with zinc chloride, cadmium chloride or stannic chloride.

The acid stabilizers are organic acids such as citric acid, tartaric acid and naphthalene trisulfonic acid, or inorganic acids such as hydrochloric acid and sulfuric acid. The antioxidants include, e.g., thiourea. The wetting agents include, e.g., saponin. The intensifiers include, e.g., zinc chloride, zinc sulfate or magnesium chloride. Furthermore, a developing accelerator such as polyethylene glycol and thiourea derivatives may be also employed.

As a supporting sheet for a diazotype light-sensitive material, papers, tracing paper and films of cellulose acetate or plastics may suitably be used.

The present invention is illustrated by the following examples.

Example 1 water—100 cc
polyvinyl alcohol—5 g
sodium 2,4,6-trihydroxy- 3-benzoylbenzoate—2 g
4-(N-ethyl-N-benzylamino) benzene diazonium chloride 1/2ZnCl$_2$—0.5 g
thiourea—1 g
ZnCl$_2$—1 g
tartaric acid—1 g
saponin—0.1 g A diazotype light-sensitive composition was prepared from the above ingredients using the following procedure:

After the polyvinyl alcohol was dissolved in water, the coupling component (sodium 2,4,6-trihydroxy-3-benzoylbenzoate) was added to the solution and then the diazonium compound was slowly added to obtain a colloidal solution. Thereafter, the other ingredients (additives) were added to the colloidal solution.

A two-component diazotype light-sensitive material was made by coating said light-sensitive composition on paper to which had been applied a precoat made from a mixture of 100cc of water, 10g of silica and 30g of polyvinyl acetate emulsion (solid 50 percent). The dried light-sensitive material thus obtained gave a clear blue dye image of high density by exposing to light under an opaque image in the same way as a conventional diazotype material and developing by heating the sheet over a roller heated to 170° C.

Example 2
  water—100 cc
  polyvinyl alcohol—5 g
  sodium 2,6-dihydroxy-3,5-dichlorobenzoate—2 g
  4-(N,N-diethylamino) benzene diazonium chloride 1/2$ZnCl_2$—1 g
  thiourea—1 g
  $ZnCl_2$—1 g
  citric acid—1 g
  polyethylene glycol—2 g
  saponin—0.1 g A diazotype light-sensitive composition was prepared from the above ingredients using the same procedure as described in Example 1.

A two-component diazotype light-sensitive material was made which gave a blue dye image of high density by exposing to light and developing in the same manner as that in Example 1.

Example 3
  water—100 cc
  ethylated starch—15 g
  sodium 2,6-dihydroxy-4-methoxy-benzoate—2 g
  2,3-diethoxy-4-(N-benzoylamino)benzene diazonium chloride 1/2$ZnCl_2$—1 g
  thiourea—1 g
  $ZnSO_4$—1 g
  citric acid—0.5 g
  saponin—0.5 g A diazotype light-sensitive composition was prepared from the above ingredients using the same procedure as described in Example 1. Thus, after the ethylated starch was dissolved in water, the other ingredients were added to the solution.

A two-component diazotype light-sensitive material made from the resulting composition had the same properties as the composition described in Example 1.

Example 4
  water—100 cc
  etherified starch—15 g
  sodium 2,6-dihydroxy-3-ethyl- 5-chlorobenzoate—2 g
  4-(N,N-dimethylamino) benzene diazonium chloride 1/2$ZnCl_2$—1 g
  thiourea—1 g
  $MgCl_2$—0.5 g
  naphthalene trisulfonic acid—1 g
  saponin—0.5 g A diazotype light-sensitive composition was prepared from the above ingredients using the same procedure as described in Example 1. Thus, after the etherified starch was dissolved in water, the other ingredients were added to the solution.

A two-component diazotype light-sensitive material made from the resulting composition had the same properties as the composition described in Example 1.

In the above Examples, all the light-sensitive compositions were also prepared without using polyvinyl alcohol or denatured starch, and they produced a tar-like material or a water-insoluble precipitate and consequently could not be applied on a supporting sheet.

In Examples 1 and 2, the light-sensitive compositions prepared by using polyvinyl acetate emulsion in place of polyvinyl alcohol resulted in the formation of a tar-like material or a water-insoluble precipitate. The light-sensitive compositions thus obtained could not be used.

In Examples 3 and 4, the light-sensitive compositions prepared by using dextrin, rice starch or starch acetate in place of ethylated starch or etherified starch resulted in the formation of a tar-like material. However, dextrin was only slightly effective in preventing the formation of a tar-like material.

What is claimed is:

1. A process for producing a diazotype light-sensitive material consisting essentially of the steps of
   a. dissolving at least one member selected from the group consisting of polyvinyl alcohol, ethylated starch and etherified starch in water;
   b. dissolving in the resulting solution, an azo coupling component selected from the group consisting of a polyhydroxy benzoic acid, a derivative thereof and the sodium, potassium, calcium and ammonium salts thereof, and then adding thereto a light-sensitive diazonium compound and
   c. coating the resulting solution onto a supporting sheet to obtain the desired diazotype light-sensitive material.

2. A process according to claim 1, wherein said polyhydroxybenzoic acid is a member selected from the group consisting of 2,6-dihydroxybenzoic acid and 2,4,6-trihydroxybenzoic acid.

3. A process according to claim 1, wherein said derivative of polyhydroxybenzoic acid is a member selected from the group consisting of 2,6-dihydroxy-3,5-dichlorobenzoic acid, 2,6-dihydroxy-4-methoxybenzoic acid, 2,6-dihydroxy-3-ethyl-5-chlorobenzoic acid and 2,4,6-trihydroxy-3-benzoylbenzoic acid.

4. A process according to claim 1, wherein said coupling component is a sodium-, potassium-, calcium- or ammonium salt of said polyhydroxybenzoic acid or derivative thereof.

5. A process according to claim 1, wherein said diazonium compound is a member selected from the group consisting of 4-(N,N-diethylamino) benzene diazonium, 4-(N,N-dimethylamino)benzene diazonium, 2,3-diethoxy-4-(N-benzoylamino)benzene diazonium, 4-(N-ethyl-N-benzylamino)benzene diazonium and 4-(N-cyanoethyl-N-cyclohexylamino) benzene diazonium.

* * * * *

UNITED STATES PATENT OFFICE
CERTIFICATE OF CORRECTION

Patent No. 3,793,030                    Dated Feb. 19, 1974

Inventor(s) Tomiaki Asami

It is certified that error appears in the above-identified patent and that said Letters Patent are hereby corrected as shown below:

In Column 1, first portion of the Patent insert --

Claims priority, Japanese Appln. No. 76645/1967, filed November 29, 1967--

In Column 2, line 14, after "an" insert --ethylated--

In column 2, line 20, after "component" insert --are--

Signed and sealed this 5th day of November 1974.

(SEAL)
Attest:

McCOY M. GIBSON JR.
Attesting Officer

C. MARSHALL DANN
Commissioner of Patents